United States Patent
Kaji et al.

(10) Patent No.: US 6,417,647 B2
(45) Date of Patent: Jul. 9, 2002

(54) CHARGING SYSTEM AND CHARGING METHOD FOR USE OF BATTERY POWER

(75) Inventors: Takeo Kaji; Kiyoshi Kai, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/821,318

(22) Filed: Mar. 29, 2001

(30) Foreign Application Priority Data

Mar. 31, 2000 (JP) ...................................... 2000-101270

(51) Int. Cl.⁷ ........................................... H01M 10/46
(52) U.S. Cl. ..................................................... 320/132
(58) Field of Search ................................ 320/106, 110, 320/132, 135, DIG. 21; 324/426; 340/635, 636; 429/61, 90

(56) References Cited

U.S. PATENT DOCUMENTS 4,532,418 A * 7/1985 Meese et al.
5,263,565 A * 11/1993 Wilkinson

* cited by examiner

Primary Examiner—Edward H. Tso
(74) Attorney, Agent, or Firm—Frommer Lawrence & Haug LLP; William S. Frommer

(57) ABSTRACT

A battery pack (10) used as the power source of a portable information device (11) is configured to measure the consumption of battery power and transmit data indicating the measured consumption of battery power together with a battery pack ID code and a charging server IP address to the information device (11). The information processing apparatus (11), when connected to the internet, transmits the data on the consumption of battery power and the battery pack ID code given from the battery pack (10) to a charging server (12). The charging server (12) refers to the information given from a contract matter input device (16) and calculates the charge for the consumption of battery power on the basis of the data on the consumption of battery power and the battery pack ID code. The charged for consumption of battery power calculated by the charging server (12) is transmitted together with data including an account number of the account for payment of the charge to an account managing server (13) of a bank, for example, to enable procedures of automatic payment of the charge from the account.

13 Claims, 2 Drawing Sheets

CHARGING SYSTEM AND CHARGING METHOD FOR USE OF BATTERY POWER

BACKGROUND OF THE INVENTION

1. Field of the Invention

This invention relates to a charging system and a charging method for the use of a battery pack used as a power source of an information processing device.

2. Description of Related Art

In a business making profits by providing network services, like charges for telephone calls, for example, for users of portable telephones, the user's initial expense, such as the cost of the information device like a telephone set, is often suppressed for the purpose of acquiring as many users as possible. In this case, the sale of information devices itself will often produce a loss.

In the above-mentioned case, the compensation for a battery pack used as the power source of the information device is recovered by selling the battery pack as hardware. In case such a compensation recovery system is used, there arises the problem that it is difficult to maintain a reasonable price of the battery pack.

Once the battery pack is sold as hardware, there is a great possibility that the battery pack, after use, is disposed as waste and contaminates the environment. Additionally, this is undesirable also from the viewpoint of effective use of resources.

OBJECT AND SUMMARY OF THE INVENTION

It is therefore an object of the invention to provide a charging system and a charging method for use of battery power, which can maintain an appropriate compensation for a battery power used as the power source of a portable information device, for example, and contributes to preventing environmental contamination and effective use of resources.

According to the first aspect of the invention, there is provided a charging system for consumption of battery power characterized in automatically charging for consumption of battery power of a battery pack used as the power source of an information device, by using a predetermined information line.

According to the second aspect of the invention, there is provided a charging method for consumption of battery power characterized in automatically charging for consumption of battery power of a battery pack used as the power source of an information device, by using a predetermined information line.

According to the invention summarized above, it is possible to collect the compensation for use of a battery power by charging a user for power actually used with an information device instead of selling a battery power pack itself.

DESCRIPTION OF THE PREFERRED EMBODIMENTS

Figure 1:
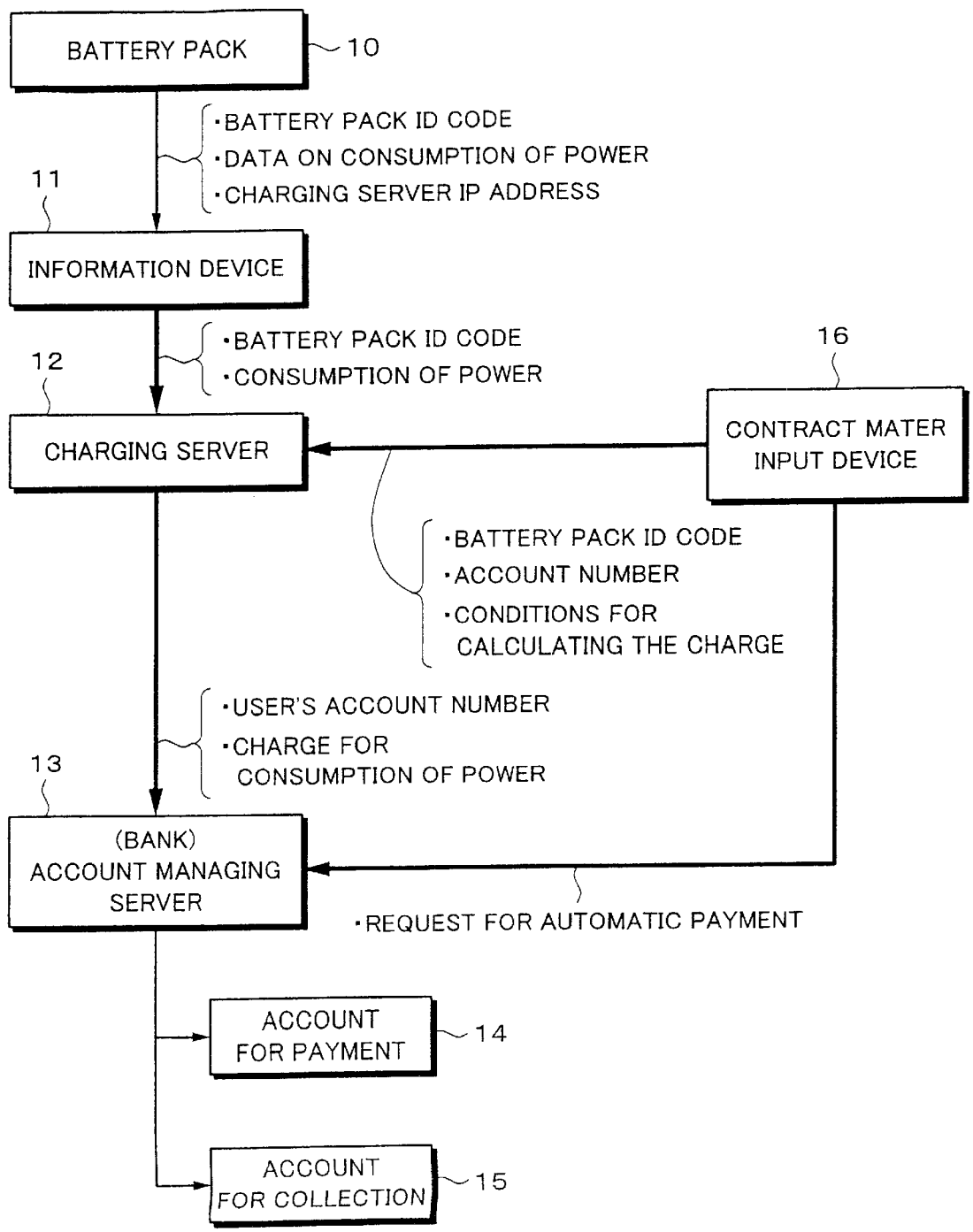
FIG. 1 is a block diagram for explaining an embodiment of the invention.

With reference to FIG. 1, an embodiment of the invention is explained below. The embodiment shown here will be explained as using a portable information device that can be connected to the Internet. In FIG. 1, the internet line is shown by a solid line. A battery power pack 10 used as the power source of the portable information device measures the consumption of battery power, and transmits data about the consumption of battery power, measured, together with a battery power pack ID code and a charging server IP address, to the information device 11. The data on the consumption of battery power may be made on the basis of the measured quantity of discharged power, discharged time, or the like. Data transmission from the battery pack 10 to the information device 11 takes place every time when the information device 11 should send data to a charging server 12, every certain intervals (such as every month) determined by a contract, for example.

When the information device 11 is connected to the Internet, it transmits data on the consumption of battery power supplied from the battery pack 10 and the battery pack ID code to the charging server 12 having charging server IP addresses transmitted from battery packs 10. The charging server 12 stores trade information tables made for individual battery pack services upon respective sales contracts, on the basis of information transmitted from contract matter input devices 16 (explained later) for inputting the contents of sales contracts of individual battery pack services. Then, the charging server 12 selects one of the trade information tables in storage, which corresponds to the battery pack ID code actually transmitted.

Each trade information table has description about conditions for calculating the collecting the charge and conditions for collection of the charge. Condition for calculating the charge may include charging for power, basic charge per month, prescription about discount, and so on. Conditions for collection of the charge may include the IP address of an account managing server 13 of a bank, for example, account number of the user's bank for automatic payment of the charge from the account, and so on.

The charging server 12 makes reference to the conditions for calculating the charge described on the trade information table, and based on the data on the consumption of battery power, calculates the charge for consumption of battery power in one month, for example. Then, the charging server 12 transmits the calculated charge for consumption of battery power together with the data about the user's account number for charging to the account managing server 13 of the user's bank account, for example, having the IP address described on the trade information table. The account managing server 13 does automatic settlement from the user's designated bank account when so requested by the user for the charge for consumption of battery power. That is, the account managing server 13 deducts the amount of the charge for consumption of battery power from the use's account 14 with the account number transmitted from the charging server 12, based on the data transmitted from the charging server 12, and transfers it to the supplier's account for collection 15.

The contract matter input device 16 is a means for inputting the contents of each sales contract of the battery pack service. The contract matter input device 16 transmits the trade information table containing the ID code of the battery pack under the contract, account number of the user's charging account, conditions for calculating the charge for consumption of battery power, and so on, to the charging server 12. Further, the contract matter input device 16 transmits to the bank account managing server 13, for example, a request of automatic settlement of the amount of charge for consumption of battery power from the account designated by the user upon the subscription, for example.

FIG. 1 illustrates the system as using the internet line for transmission of information between the information device 11 and the charging server 12, between the charging server 12 and the account management server 13, and between the contract matter input device 16 and the charging server 13. However, another appropriate information line other than the internet line, such as exclusive line, may be used as well.

Next referring to FIG. 2, another embodiment of the invention will be explained. The embodiment shown here will be explained as using a portable information device, such as portable telephone, which only functions to transmit and receive voice information, for example but cannot be connected to the Internet. In FIG. 1, the internet line is shown by a solid line. A battery pack 20 used as the power source of the portable information device measures the consumption of battery power, and transmits data about the consumption of battery power, measured, together with a pack ID code and a charging server IP address, to the information device 21. The data on the consumption of battery power may be made on the basis of the measured quantity of discharged power, discharged time, or the like.

When the information device 21 is connected to an exclusive line, for example, it transmits the data about the consumption of battery power sent from the battery pack 20, together with the battery pack ID code, ID of the information device and charging server IP address, to the charging server 22 having charging server IP addresses transmitted from battery packs 20, through the exclusive line prepared for charging for the use of a line. The charging server 22 for charging the use of a line, for example, calculates the consumption of battery power, based on the data about the consumption of battery power, battery pack ID code and ID of the information processing device that are transmitted from the information device 21.

Calculation of the charge for use of battery power will explained below specifically. The charging server 22 for the use of a line, for example, stores data in form of trade information tables made for individual battery pack services upon respective sales contracts, as will be explained later, and selects one of the trade information tables in storage corresponding to the battery pack ID code transmitted from the information device 21. Each trade information table has description of conditions for calculation of the charge for consumption, including charging for power, basic charge per month, prescription about discount, and so on. By referring to those calculation conditions, the charging server 22 for charging for the use of a line, for example, can calculate of the charge for use of battery power on the basis of the data about the consumption of battery power transmitted from the information device 21.

The charging server 22 for charging for the use of a line, for example, transmits the calculated charge for consumption of battery power together with the battery pack ID code to a charging server 23 for charging for consumption of battery power through the internet line. In FIG. 2, the internet line is shown by a solid line. The battery consumption charging server 23 stores trade information tables prepared for individual battery pack services upon respective sales contracts, on the basis of information transmitted from the contract matter input device 26 (explained later) through which contents of sales contracts of battery pack services are entered. Then, the charging server 23 selects one of trade information tables in storage corresponding to the battery pack ID code actually transmitted.

Each trade information table has description about conditions for calculating the collecting the charge and conditions for collection of the charge. Condition for calculating the charge may include charging for power, basic charge per month, prescription about discount, and so on. Conditions for collection of the charge may include the IP address of an account managing server 24 of a bank, for example, account number of the user's designated bank and so on. The battery consumption charging server 23 transmits the account number for payment, the charge for consumption of battery power calculated by the line use charging server 22, for example, and so on, to the account managing server 24 of a bank, for example, having the specific IP address. Responsively, the account managing server 24 takes procedures for automatic payment of the charge for consumption of battery power. The procedures of automatic payment are equal to those of the account managing server 13 show in FIG. 1, and are not explained here.

On the other hand, there is also a system configuration permitting each user to electrically charge the battery pack 20 with a charger 25 connected to the internet and charging the user for power electrically charged with the charger 25. The charger 25 may be equipped anywhere convenient for users to use it, such as hotels, stations, drug stores, or the like. In this case, the battery pack 20 is preferably made of a battery enabling precise measurement of the charged power, such as lithium ion battery, for example. Once the battery pack 20 is connected to the charger 25, the battery pack ID code, data about the consumption of battery power, charging server IP address, and so on, are transmitted from the battery pack 20 to the charger 25.

The charger 25 confirms that the connected battery pack 20 is properly supported by a contract, by making an inquiry to the battery consumption charging server 23 through the internet line, for example. Once the battery pack 20 is confirmed to have the support of a contract, the charger 25 electrically charge the battery pack 20. Then the charger 25 transmits data indicating the electrically charged amount of power together with the battery pack ID code to the battery consumption charging server 23 through the internet line. Based on the transmitted data, the battery consumption charging server 23 generated data for automatic payment for consumption of battery power, and transmits that data to the account managing server 24 of a bank, for example.

The contract matter input device 26 is a means for inputting the contents of each sales contract of the battery pack service. The contract matter input device 26 transmits the trade information table containing the ID code of the battery pack under the contract, conditions for calculating the charge for consumption of battery power, and so on, to the charging server 22. Additionally, the contract matter input device 26 transmits information about automatic payment, such as account number of a designated user's account, to the battery consumption charging server 23. Further, the contract matter input device 26 transmits a request of automatic payment of the charge for consumption of battery power from a user's account, which will be done by the user upon conclusion of the contract, for example, to the account managing server 24 of a bank, for example.

Figure 2:
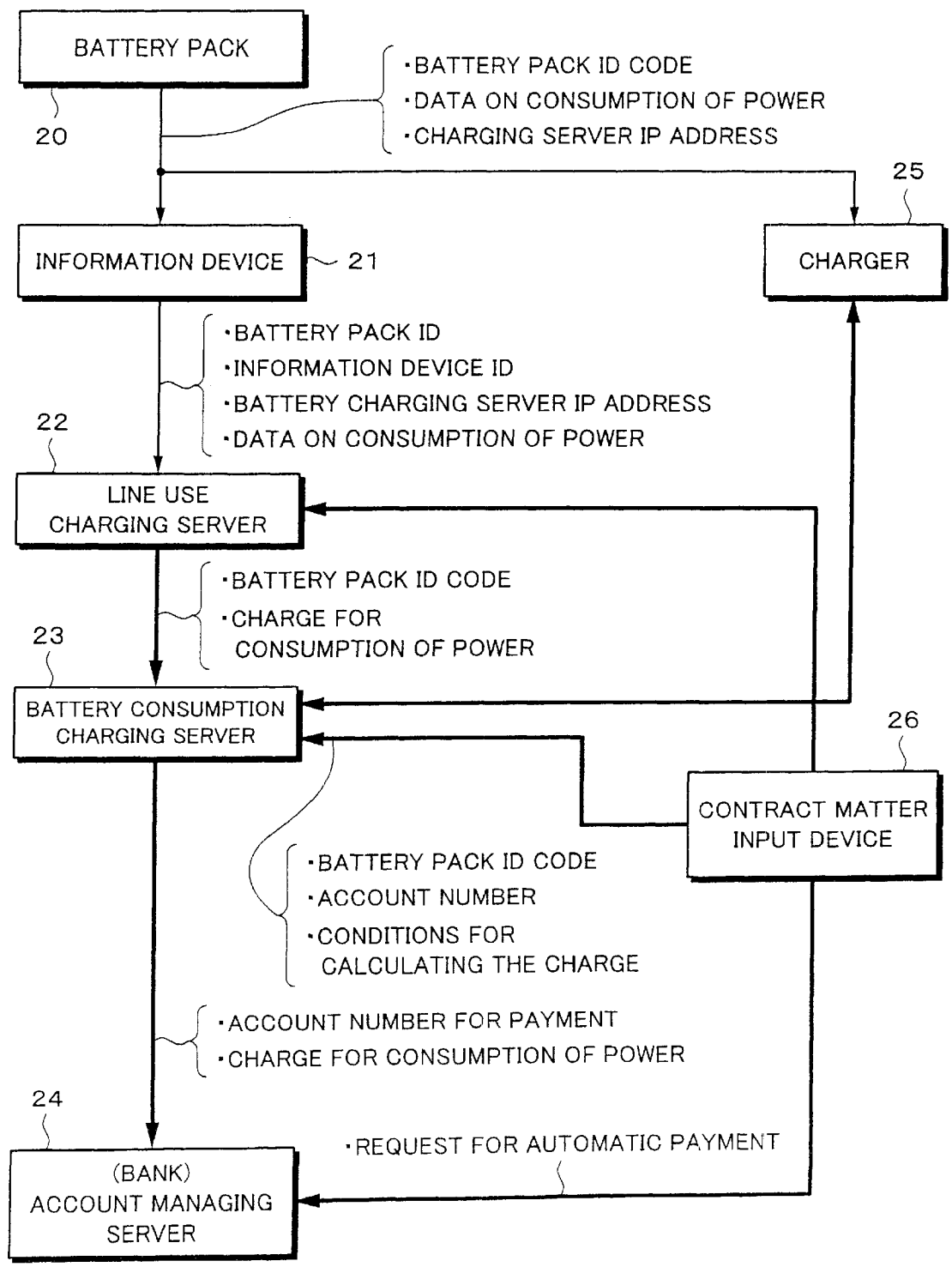
FIG. 2 is a schematic diagram for explaining another embodiment of the invention.

FIG. 2 illustrates the system as using the internet line for transmission of information between the line use charging server 22 and the battery consumption charging server 23, between the battery consumption charging server 23 and the account managing server 24, between the contract matter input device 26 and the line use charging server 22, between the contract mater input device 26 and the account managing server 24, and between the charger 25 and the battery consumption charging server 23. However, another appropriate information line other than the internet line, such as exclusive line, may be used as well.

In the further embodiment of the invention, the information device 21 is configured to exchange data, including the battery pack ID code, data about the consumption of battery power, charging server IP address, and so on. Additionally, the line use charging server 22 is configured to calculate the charge for consumption of battery power, based on the battery pack ID code, data on the consumption of battery power, and others. However, if it is considered that these procedures impose excessive loads to the information device 21, line use charging servers 22 or information lines connecting them and constitute a bar to realization of the system, the line use charging server 22 may be configured to simply calculate the charge for consumption of battery power in the following manner.

(1) The duration of time the information device 21 uses the line is regarded to be the charge for consumption of battery power.

(2) The charge for consumption of battery power is-fixed at a constant price related to the type of the battery pack 20, the type of the information device 21, or the like.

These ways of calculation of the charge for consumption of battery power can be used in the former embodiment of the invention as well.

Further, in order to ensure collection of charges for consumption of battery power, the following manners are employable.

(1) Each user is requested to make a deposit upon the start of the use of a battery.

(2) If data related to collection of the charge for consumption of battery power is not sent every month or in other appropriate intervals, the use of the battery pack is disabled. In this case, a timer may be provided in each battery pack to stop the supply of power when the timer counts up a predetermined duration of time and re-start the predetermined duration of time when data related to collection of the charge for consumption of battery power is sent.

(3) If data related to collection of the charge for consumption of battery power is not sent every predetermined time, an alarm is given from a personal computer connected to the internet line when the information device is connected to the computer.

(4) If data related to collection of the charge for consumption of battery power is not sent every predetermined time, a predetermined amount of money is automatically paid. In this case, when data related to collection of the charge for consumption of battery power is actually sent, the money is squared to effect payment of an appropriate sum.

(5) Information about creditability of each user is shared among brethren.

Although the embodiments have been explained as using the internet line for at least a part of exchanges of information, exclusive lines or other lines other than the internet line may be used for exchanges of information.

The invention is not limited to the foregoing embodiments, but various changes or modifications are possible within the scope of the invention.

According to the invention, it is possible to automatically charge for consumption of battery power of a battery pack in response to the actual consumption in each unit period like one month, for example. Therefore, as compared with the system of selling the battery pack as hardware, more appropriate charging is possible, and a reasonable price of the battery pack can be maintained.

Further, according to the invention, as compared with the system of selling a battery pack, disposal of battery packs as waste can be minimized. Therefore, the invention contributes to removing or alleviating the problems of environmental contamination, waste of resources, or the like.

What is claimed is:

1. A charging system for consumption of battery power characterized in automatically charging for consumption of battery power of a battery pack used as the power source of an information device, by using a predetermined information line.

2. The charging system for consumption of battery power according to claim 1 wherein said battery pack issues an ID code thereof and data indicating the consumption of battery power of said battery pack to said information device.

3. The charging system for consumption of battery power according to claim 2 wherein said data indicating the consumption of battery power of said battery pack includes data indicating the power discharged from said battery pack.

4. The charging system for consumption of battery power according to claim 2 wherein said data indicating the consumption of battery power of said battery pack includes data indicating the duration of time in which said battery pack is discharged.

5. The charging system for consumption of battery power according to claim 2 wherein said information device transmits said data output from said battery pack to a charging server through said predetermined information line.

6. The charging system for consumption of battery power according to claim 5 wherein said predetermined information line is the internet line.

7. The charging system for consumption of battery power according to claim 5 wherein said battery pack outputs the address of said charging server in said predetermined information line.

8. The charging system for consumption of battery power according to claim 5 wherein said charging server executes:
    calculating the charge for consumption of battery power on the basis of said data indicating consumption of battery power of said battery pack; and
    transmitting data related to charging, which is specified by said ID code of the battery pack, to an account managing server of a financial institute through said predetermined information line.

9. The charging system for consumption of battery power according to claim 8 wherein said charging server is supplied with and holds data concerning contents of a sales contract of said battery pack.

10. The charging system for consumption of battery power according to claim 9 wherein said data concerning contents of a sales contract of said battery pack includes a way of calculating the charge for consumption of battery power of said battery pack.

11. The charging system for consumption of battery power according to claim 9 wherein said data concerning contents of a sales contract of said battery pack includes data indicating the address of said account managing server of a financial institute.

12. The charging system for consumption of battery power according to claim 9 wherein said data concerning contents of a sales contract of said battery pack includes data indicating the account number of an account used for payment of the charge.

13. A charging system for consumption of battery power characterized in automatically charging for consumption of battery power of a battery pack used as the power source of an information device, by using a predetermined information line.

* * * * *